(a)

(b)

(c)

(d)

INVENTOR.
EDWARD WAZ

United States Patent Office 3,464,773
Patented Sept. 2, 1969

3,464,773
PHOTOMETER APPARATUS EMPLOYING MATCHED CIRCUITS
Edward Waz, Hilton, N.Y., assignor to Eastman Kodak Company, Rochester, N.Y., a corporation of New Jersey
Filed Oct. 22, 1965, Ser. No. 501,416
Int. Cl. G01j 1/44
U.S. Cl. 356—215                         6 Claims

ABSTRACT OF THE DISCLOSURE

Two circuits cooperate to actuate an indicator when their respective outputs are coincidental. The first circuit includes a photoreceptive element; and the second circuit employs a tunable element. By so setting the tunable element that the indicator gets actuated, a measure is made of the light intensity reaching the photoreceptive element.

---

Figure 1:
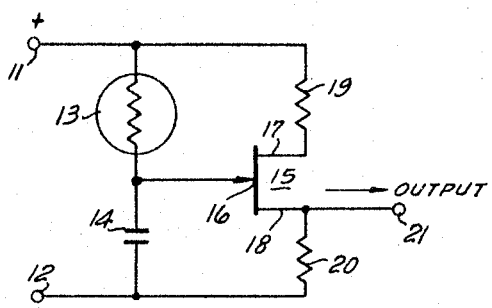
Figure 1:
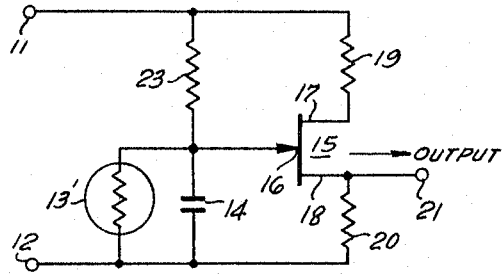
Figure 1:
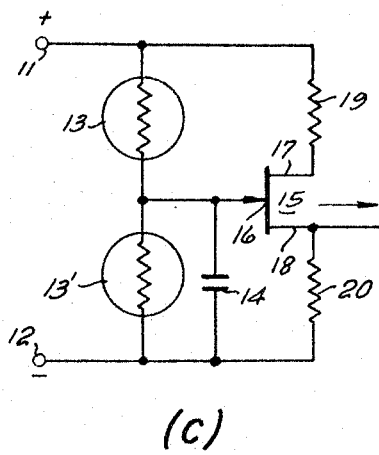
Figure 1:
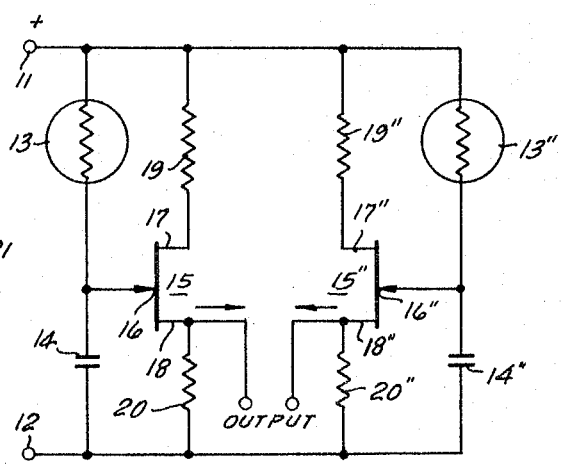

This invention is directed to apparatus and circuitry used in the measurement of light. It finds particular application in the photographic and related fields.

Measurements of quantitative changes of light intensity are customarily made by observing the effect of light impingement upon a photo-receptor. The effect may manifest itself as a generated voltage, a current or a change in the impedance of the receptor. The impedance change may itself be represented by a voltage or a current change. The simplest form of system would usually provide for applying the produced voltage or current directly to a suitable form of meter thereby to make a measurement of the relative light intensity. Greater fidelity and refinement of the measurement normally results from more elaborate circuitry and particularly from systems wherein the currents or voltages are amplified prior to the time they are impressed upon the metering circuitry. Most of the components used with conventional types of photometric devices measure the amplified signal in the form of a voltage or current. The resolving capabilities of the system depend upon the particular instrumentation used. In most instances, a resolution of about 1% is considered to be very good. A resolution of as good as 0.1% is very difficult to obtain.

Various forms of photorecptors may be used in the measurement of such light values and intensities. The apparatus may include the so-called generating types of light translators usually in the form of photovoltaic or barrier layer cells. They may also include both the high vacuum and the gaseous type, such as phototubes or photo-multipliers. A third form of such types of devices is found in the photoresistive solid state components of which the cadmium selenide and the cadmium sulphide forms are illustrative. Various other forms of semi-conductor photosensitive materials are coming into use.

As this invention is constituted, it seeks to translate a light intensity change upon a suitable photoreceptor component into a time domain. This provides a wide range of control and translation possibilities in the contemplated form of the invention to say nothing of the ability to achieve high resolution. A resolution of 0.1% is readily achievable in the contemplated form of the invention. A resolution of 0.01% is within the realm of practicality. This degree of resolution essentially provides an improvement of at least one order of magnitude over and above the apparatus customarily used in the field. It also utilizes improved circuit and component techniques.

As the invention will herein be described, it will be apparent that there is no need for amplification of any produced voltage or current. Amplification would be a completely secondary effect in the system operation. The controlling factor is substantially that of resolving whether or not any produced voltage or current is of sufficient amplitude to provide for ready detection. The apparatus and circuitry here to be described contemplates the production of a stored charge within a storage element, such as a capacitor, with the charging current being determined by a current flowing through a suitable form of light resistive element whose resistance changes in proportion to light excitation. The combination of the photoresistive element and the storage element is connected with a suitable form of unijunction transistor. A connection is made to the alloyed emitter of the unijunction element so that the potential effective at any instant is that determined by the instantaneous charge acquired by the storage element.

The unijunction transistor, as is recognized, is essentially an N-type bar with ohmic contacts at each end. It has a P-type emitter alloyed along the bar. The combination functions essentially as a voltage divider. As the component is used in the circuit here disclosed, upon the attainment of a critical potential determined by the stored charge and effective at the emitter, the unijunction transistor component serves to discharge such charge with current then flowing through the path between the emitter and the lower potential ohmic contact. The discharge of the storage element produces output pulses at the point of connection of the lower potential ohmic contact with time separation between successive pulses. The time separation of the pulses can be resolved effectively as a measurement of the light intensity which impinges upon the photoresistive element to produce the charge in the capacitor.

Various connections of the photoresistive components, whose resistance is determined by the exciting light, make it possible to arrange various forms of circuits which will serve to carry the emitter from time to time to a positive state to produce the discharge. Illustratively, the light responsive component may be serially connected with the storage element and the combination connected across the same voltage supply as the unijunction element. In another form of circuit, the photoresistive element and the storage element may be connected in parallel with the emitter and one ohmic contact of the unijunction element. The parallel connected combination is then connected in series with a suitable resistive element across the voltage supply. In order modifications, the combinations may be represented as a pair of light responsive photoresistive components serially connected together, with one of such components (usually the one connected to the more negative portion of the supply voltage) being shunted by the storage condenser element. In any case, the emitter of the unijunction transistor element is always connected to the positive terminal of the storage element.

In a further modification a similar control of the charging of a first capacitor through the radiation-responsive component may be provided. With this, a second capacitor may be charged through a resistance of known magnitude, which resistance may be varied to make the charging time of the second capacitor coincide with the charging of the first capacitor due to infalling radiation. Each capacitor is discharged through a unijunction transistor used to initiate conduction through a silicon-controlled rectifier. Current flow through one of the silicon-controlled rectifiers is adapted to short circuit both charging circuits, thereby to interrupt charging until the following half-cycle of an applied rectified voltage. The second silicon-controlled rectifier initiates current flow through an indicating device whose operation is keyed by discharge of the second condenser charge through the known resistance. Activation of the indicating device then continues for the remaining half-cycle of the power supply. The point where the indicator changes between an active and inactive state is considered to be the balance point.

Various combinations may be utilized and various components of any one selected type may be paralleled to increase the output. Multi-stages may be utilized where desired to provide a more direct indication of the sought-for effects.

The foregoing suggests that the invention may assume various circuit forms. It is accordingly one of the principal aims and objects to provide a new and noval arrangement whereby light values, illustratively, may be translated into electrical pulses which shall manifest themselves with time spacings proportionate to the intensity of the light instantaneously falling upon a light sensitive component. The timing between the pulses so developed then may be regarded as setting up a measure of the intensity of the activating light.

The invention has been illustrated by the accompanying drawings in certain of its preferred forms.

Figure 2:
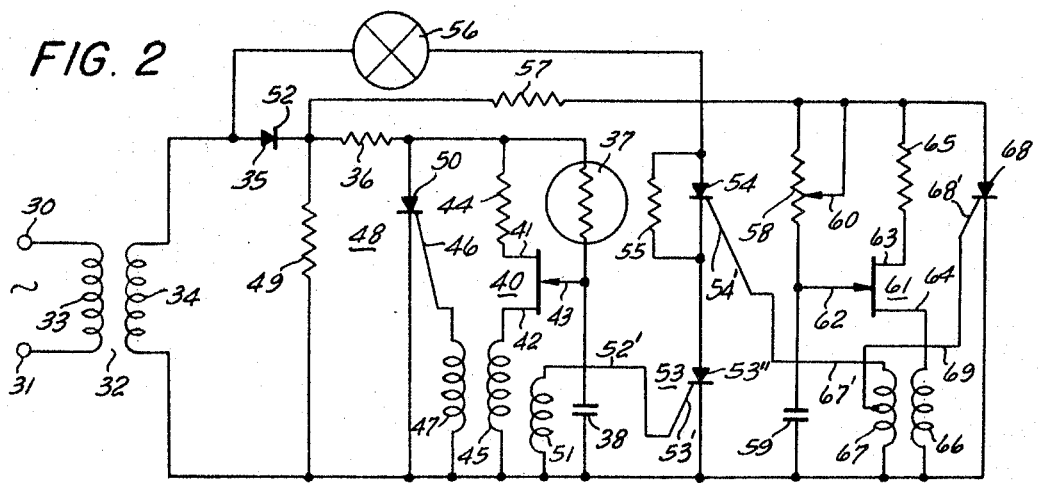
Figure 3:
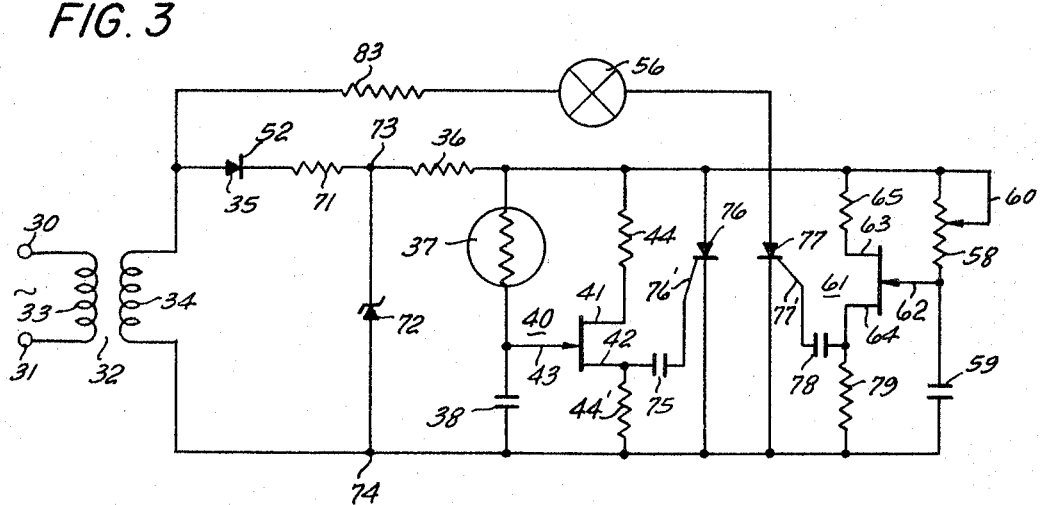

In the drawings:

FIG. 1 is a showing of various forms which the invention may assume in practice. In this figure, part a represents the capacitor element being charged through a photoreceptive light sensitive component serially connected therewith; part b represents a modification wherein the current flowing to charge the capacitor flows through a combination of a resistor and the photoresistive light sensitive component, the latter of which is paralleled with the condenser; part c represents a combination of the forms of parts a and b, and, part d provides for paralleling a pair of components of the general type shown by part a;

FIG. 2 is a schematic circuit diagram showing one preferred practical operating photometric circuit to ensure high resolution; and FIG. 3 is a modification of the circuit of FIG. 2 to achieve generally similar results with somewhat simplified circuitry.

Reference should be made to the drawings for further dtails of the invention; the more basic forms of the inventional circuit are set out by FIG. 1 and its various subparts. It will be apparent that the two primary elements of the invention are the photoreceptor and the unijunction transistor. For purposes of illustration, the light responsive element will be considered herein as being of the well-known cadmium-sulphide photoresistive variety. In the circuit shown by part a of FIG. 1, it may be assumed that a voltage is applied between the terminals 11 and 12. A positive voltage, at terminal 11, then is supplied to one terminal of the assumed cadimum-sulphide photoresistive component 13, the other terminal of the component 13 being connected with the capacitor 14 whose other terminal connects at terminal 12 to the negative side of the voltage supply source.

With this combination, a unijunction transistor element is connected to serve as a discharge-control element. The unijunction transistor functions generally as a diode with three electrode elements, and as such operates essentially as a voltage divider. The emitter component 16 is normally physically connected to a P-type material of the unit. Two ohmic terminals 17 and 18 are provided and connected to N-type material. Usually, each of these ohmic terminals connects through a resistor element, such as 19 and 20, respectively, to one side or the other of the supply voltage. An output connection is provided at 21.

In the operation of the circuit described, it may be assumed that light falls upon the photoresistive element 13 thereby to provide a current flow therethrough which is proportional to the intensity of the in-falling light. The current flow so developed serves to charge the capacitor element 14. The charging of the capacitor thus is determined by the resistance of the photoreceptive element 13 and by the capacity of the capacitor. With each increase in light applied the resistance of the photoresistive element changes from its state when not illuminated. The voltage available at the connection between the emitter 16 and the storage component is that which is determined by the circuit exitation and the applied light. With the applied voltage shown at terminals 11 and 12, the P-N junction between the emitter 16 and the unijunction transistor as a whole is reverse biased. Consequently, the only current flowing through the emitter 16 is reverse bias current. With a charging of the capacitor 14 because of current flow through the photoresistive element 13, the potential available at the emitter 16 becomes positive. When the positive potential at the emitter becomes greater than the voltage at the terminal 18, the junction 16, 18 becomes forwardly biased. The capacitor 14, under such circumstances, is discharged by current flow between the terminal 18 and the emitter 16. The discharge current flow produces a voltage pulse across the resistor 20 which is available at the output 21 to control selected forms of indicating apparatus.

In a modified form of the circuit, as shown by portion b of FIG. 1, a generally similar condition occurs except that in the modification shown, the photoresistive element 13' is connected to shunt the capacitor 14. Current then flows through a resistor 23 into the storage element 14 and simultaneously through the photoresistive element 13'.

The modification of part c of this figure combines the circuitry of parts a and b with the photoresistive element 13 replacing the resistor 23 of part b and the photoresistive element 13' located as shown by the circuit of part b.

The portion d of FIG. 1 essentially combines and doubles in parallel circuitry components of the type shown by part a of this figure. This provides two outputs of like nature at output terminals 21 and 22. In this figure, the components shown with the double prime (″) designation are essentially duplicates of the parts already explained in connection with circuit part a. Each time the capacitor 14 is discharged, the charging cycle is restarted. The rate of restoring the charging is governed by the resistance of the assumed cadmium-sulphide photoresistive element. Each time a change in light incident upon the photoresistive element occurs, the charging rate of the capacitor varies. This provides that the potential at the emitter 16 shall increase (become more positive) more or less rapidly with the rate thereof being indicative of the incident light.

Making reference now to FIG. 2 of the drawings, the input voltage to the system may be assumed as being from suitable alternating current supply mains (not shown) at terminals 30 and 31. The input voltage is fed through transformed 32 of which the primary winding 33 is connected to the input terminals. The secondary winding 34 is connected to energize the various circuit components of the photometric device. Ordinarily, the transformer 32 is of the step-down variety. For most functionings of the circuit, it is desirable to consider a voltage in the secondary winding of the order of about twenty volts although this value is given for illustrative purposes only and should not be considered limiting. It may be assumed that the input alternating current is of the usual 60 cycle variety, although, here also, this is illustrative.

The voltage output of the secondary winding 34 is normally rectified by half-wave rectifier diode 35 of any well known solid state type so that there is available rectified voltage impulses of the positive half cycle of the input and, thus, pulses of a duration of 1/120 second. The rectified output of the rectifier 35 is then fed by way of a resistor element 36 to energize a suitable radiation responsive component, such as the schematically illustrated cadmium-sulphide photoresistive cell 37. Current flowing through the radiation responsive means 37 is proportional to the activation thereof, as by an in-falling light. Current through the cell is adapted to charge the capacitor 38 which is serially connected therewith.

The capacity charge will be accumulated at a rate which is then determined by the intensity of radiation (here assumed illustratively to be illumination) reaching the device 37. For purposes of illustrationg one form of the operation, a unijunction transistor element, conventionally represented at 40, has its usual emitter contact 43 connected to the junction of the element 37 and the capacitor 38 so that it assumes the positive potential to which the capacitor charges. The ohmic contacts 41 and 42 of the unijunction device are connected respectively through the resistor 44 to receive the positive voltage output from the half-wave rectifier and, through the transformer winding 45, to the terminal of the secondary 34 of the transformer 32 opposite that to which rectifier 35 connects. The unijunction transistor device 40 serves as a component to discharge the charge stored by the capacitor 38. Discharge occurs at a time when the capacitor is charged to a level sufficient to maintain a current flow between the ohmic contact 42 and the emitter contact 43, as already explained in connection with the discussion of the unijunction component 15, for instance.

Current flow resulting from such functioning of the unijunction transistor device 40 thus produces a pulse through the winding 45 which, in turn, is manifested in each of the secondary windings 47 and 51. Considering first the secondary winding 47, it will be observed that one terminal is connected to the terminal of capacitor 38 which charges negatively. The other terminal is connected to the gate contact 46 of a silicon controlled rectifier 48. Anode 50 is connected to receive positive voltage from the rectifier 35. Each time the unijunction transistor 40 discharges capacitor 38, a pulse is transferred through the transformer winding 47 to the gate electrode 46 of the silicon controlled rectifier 48 (commonly called a "SCR" which terminology will be used hereafter) thereby to initiate a current flow therethrough. As can be seen, current flow through the SCR 48 forms a short circuit across the unijunction transistor 40, as well as across the serially connected combination of the radiation responsive device illustrated in the form of the cadmium-sulphide photoresistive cell 37 and the capacitor 38.

The combination above explained which results in a pulse being developed in the winding 47 also simultaneously develops a pulse in the secondary winding 11 of the transformer connected to the unijunction transistor device 40. The winding 51 has one terminal connected by way of the conductor 52 to the gate electrode 53 of a second SCR 53 whose cathode connects to the low voltage side of transformer winding 51, and whose anode 53" connects to the cathode of SCR 54 and one terminal of the resistor 55. Each time the unijunction device 40 is discharged, the gating pulse applied to the gate contact 53' of SCR 53 causes SCR 53 to conduct concurrently with conduction occurring through the SCR 48. If the aforesaid condition exists when SCR 54 is non-conducting, current from SCR 53 flows through the serial combination of resistor 55 and the lamp which is connected to one terminal of the secondary winding 34 of transformer 32. This current flow (even with resistor 55 in the current path) is sufficient to maintain SCR 53 in a conductive state following its triggering or firing by the pulse available at the gate electrode 53', it being understood that SCR 54 is non-conducting because it has not yet been fired. Although the current flow is sufficient to maintain conduction through SCR 53 by way of resistor 55 and lamp 56 for one half cycle of the impresed line alternating current, it is nevertheless not sufficiently high to cause the lamp 56 to light.

If now the righthand portion of the circuit of FIG. 2 be considered, there is a charging path for capacitor 59 established through resistor 57 connected to the junction of the rectifier 35 and resistor 36 and the serially connected potentiometer 58. A slider element 60 provides an adjustable tap on the potentiometer 58 thereby to adjust the charging rate of the capacitor 59. It may be assumed for the moment that the potentiometer 58 is first adjusted by the positioning of the tap point 60 thereon near the highest point on the resistance element 58. The normal rate of charging of the capacitor 59 for this condition probably will be considerably slower than the charging rate of capacitor 38. Regardless of the time duration for charging capacitor 59, when a certain positive voltage appears thereacross the unijunction transistor element 61 fires to cause current to flow between the ohmic contacts 63 and 64. A voltage pulse is developed across the transformer primary winding 66 connected to the ohmic contact 64. This is an action similar to that already explained relative to the discharge of capacitor 38. The voltage pulse so resulting in the primary winding 66 is sufficient to induce a pulse in the secondary winding 67 which has one end connected by a conductor 67' to the gate contact 54' of the SCR 54. The resultant gating pulse is then sufficient to gate SCR 54 to a conducting state for the remainder of the positive half-cycle of the supplied voltage.

The same pulse is also available by way of the connection from the winding 67 to SCR 68 through conductor 69 connected to the gate contacts 68'. As was explained in connection with the operation of SCR 48, any current which flows through SCR 68 acts in a generally similar manner and forms a short circuit around the unijunction transistor 61 and renders it ineffective for further operation until the next positive half-cycle of the line voltage applied through the secondary transformer 34.

Considering now operation of SCR 54 and its triggering achieved by virtue of the pulse supplied through conductor 67' to the gate contact 54', current flow through SCR 54 establishes a short circuit around resistor 55. Considering also that SCR 53 has been assumed to have been triggered to a conducting condition as a result of the current pulse through the winding 51, there is established, as soon as SCR 54 is made conducting, substantially a direct connection between one side of the transformer winding 34 and its lower side through the lamp 56 and the winding 51 with substantially no voltage drop occurring through either SCR 53 or 54.

This permits the lamp 56 to be lit during periods when each of SCR 53 and 54 is concurrently carried to a conducting state. The lamp 56 will accordingly light concurrently with current flowing through SCR 53 and 54 and it will remain lit during the remainder of the particular half-cycle during which supply current flow is originally initiated. As soon as the current supplied to the transformer secondary reverses its polarity for the next succeeding half-cycle, current ceases to flow through the rectifier 35 which cuts off the operation of SCR 48 and SCR 68. This occurs at the same time that SCR 54 and SCR 53 are made non-conducting. This renders all of the SCR devices and the unijunction transistor devices 40 and 61 non-conductive at the same time. The circuit is then restored to the conditions initially assumed in this description.

The operation already described will then repeat itself on alternate half-cycles so that, assuming the conditions already explained, the lamp 56 at a light and flicker frequency of 60 cycles per second. The flickering of the lamp 56 however is such that it may indicate to the operator of the circuitry the fact that the potentiometer 58 serving to charge the capacitor 59 is set or adjusted to too high a value. The result is that the tapping point 60 is appropriately lowered on the resistive portion of the potentiometer 58 so that the setting can be made to constitute a direct indication of the illumination falling upon the photoresistive element 37 acting as a radiation responsive device.

Assuming, on the other hand, that the potentiometer 58 was initially adjusted to a relatively low value, it will be appreciated that SCR 54 would receive its triggering pulse from the winding 67 prior to the time that SCR 53 would be triggered because current would flow at an earlier time period through the unijunction transistor 61 thus serving to trigger each of SCR 54 and 68. For this condition, if it be assumed that SCR 53 is still non-conducting, the momentary conductive state of SCR 54 will produce no effect at all as far as the lamp 56 is concerned.

Then, when SCR 53 is later triggered by following the procedure above outlined, SCR 54 will be in a non-conductive state and, as a result, the lamp 56 will not be lit at all.

By adjusting the gate 58 once again while observing the lamp 56, the operator may obtain a setting of the potentiometer where the lamp 56 will just begin to flash on and off at the 60 cycle frequency. This provides a setting of the potentiometer which is essentially precisely at the edge between lamp lighting and non-lighting conditions and this corresponds to the intensity of illumination falling upon the radiation responsive device in the form of the cadmium-sulphide photoresistive cell 37. The setting of the potentiometer thus becomes a measure of the light value being tested.

In this connection, it might be pointed out that while the unijunction transistor devices 40 and 61 connect to the resistive and capacitive circuits in a fashion somewhat similar to the way in which such devices connect for use in an oscillatory circuit, the device is never permitted to break into oscillation because the firing or operation of either SCR 48 or SCR 68, as the case may be, renders each of the unijunction transistor devices 40 and 61 inactive prior to the time any oscillation can occur following the first discharge pulse. Consequently, each of the unijunction devices may be considered as if used to measure the time interval between the application of the operating potential, that is, the time in the positive going half-cycle of the supply voltage, and that when the capacitor attains the necessary voltage to produce a discharge impulse of current flowing through the unijunction devices.

The circuit of FIG. 3 provides a modification of the circuitry of FIG. 2, above noted. The circuit of FIG. 3, it will be observed, is one whereby the pulse transformers comprising the windings 47 and 51 and windings 66 and 67 may be eliminated, as well as two of the SCR units. In the circuit of FIG. 3, similar components bear similar numerical indicia to those of FIG. 2. In the FIG. 3 circuit resistor 71 serves as a dropping resistor. The voltage available across the circuit to energize the various components thereof is set and determined by the Zener diode 72. In most instances, the Zener diode may be one which provides approximately twenty volts between terminals 73 and 74 when the assumed 60 cycle alternating voltage is supplied at the input terminals 30 and 31. The remaining components of the circuit are generally similar to the circuit of FIG. 2 and it will be noted that the capacitor 38 is charged through the radiation or light responsive component 37 and discharged through the unijunction transistor element 40. A voltage divider effect is maintained between the ohmic contacts 41 and 42 by way of the resistors 44 and 44', with the discharge of the capacitor 38 through the ohmic contact 42 and the resistor 44'. At each capacitor discharge a pulse is developed across the resistor 44' in a fashion similar to that impulse developed across the winding 45 of the transistor in FIG. 2.

With a development of this pulse, a voltage is transferred by way of the capacitor 75 to the gating contact 76' of SCR 76 thereby to gate or trigger the component to a conducting state.

Capacitor 59 is charged in the fashion already explained for charging capacitor 59 in connection with FIG. 2. The output pulse developed across the resistor 79 connected to the ohmic contact 64 of the unijunction transistor 61 with discharge of capacitor 59 is transferred through the capacitor 78 to the gating contact 77' of SCR 77 thereby to carry the SCR unit to a conducting state. This normally provides for illumination of the lamp 56 connected in series with the resistor 83 to one terminal of the secondary winding 34. If the unijunction transistor 40 conducts at a time prior to the establishment of conduction through the unijunction transistor 61, the voltage pulse across resistor 44' will be transferred through the capacitor 75 to the control gate 76' of SCR 76 to produce current flow therethrough. This current flow not only disables unijunction transistor device 40 but also unijunction transistor device 61 whose ohmic contacts are connected through resistors to receive the voltage available at junction points 73 and 74, as dropped by the resistor 36. Consequently, each of unijunction transistor devices 40 and 61 is rendered non-conductive for the remaining portion of the half-cycle of the supplied voltage.

Consequently, the lamp 56 cannot light for any condition where the unijunction transistor 40 conducts prior to the establishment of conduction through the unijunction transistor device 61. This establishes the resistance fact that if the setting of potentiometer 58 is too high for the particular degree of illumination upon the photo-responsive device 37, the lamp 56 will not light. On the other hand, if the resistance setting of the potentiometer 58 is made sufficiently low so that the unijunction transistor 61 conducts or fires prior to unijunction transistor device 40, the lamp 56 will light by virtue of the conductive path established through SCR 77; the lamp will remain lit for the remaining half-cycle of the line voltage. In this case also, the setting of the potentiometer 58 which corresponds to the point at which light on the photoresistive element 37 produces a charge which will cause the unijunction transistor 40 to conduct, the system is changed from a flickering condition to a non-lighting condition in a way corresponding to the degree of illumination on the device 37 at the time. Under either condition, operation of the unijunction device 40 (and with it SCR 76) disables the unijunction device 60 by shunting its supply voltage. Under the circumstances, the period of illumination of the lamp 56 establishes the intensity of illumination and is a measure of the aims and objects hereinabove sought.

While the circuit parameters may be varied within wide limits, it may be mentioned for illustrative purposes that the following table of values has been found suitable for efficient use in the obtainment of photometric measurements. Illustrative of such components, one may assume that the entire group of resistors is of the half-watt variety and the following conditions may be assumed to apply for the circuit of FIG. 2.

Resistors 36 and 57 each _____ 3.3K.
Resistors 49 and 55 _____ 6.8K (one watt).
Resistors 44 and 64 _____ 180 ohms.
Resistor 58 _____ 50K (potentiometer).
Unijunction transistors 40 and 61__ 2N491.
SCR 48, 68, 54 and 53 _____ 2N2326.
Diode 35 _____ 1N3254.

For the circuit of FIG. 3:

Resistor 83 _____ 27 ohms (2 watts).
Resistor 71 _____ 350 ohms (50 watts).
Resistor 36 _____ 3.3K ohms.
Resistors 44 and 65 _____ 180 to 560 (½ watt).
Resistors 44', 79 _____ 56 ohms.
Resistor 58 _____ 50K to 100K
　　　　　　　　　　　　　　　　　potentiometer.
Capacitors 75, 78 _____ 0.0068 mfd.
Capacitors 38, 59 _____ 0.1 mfd.
Unijunctions 40, 61 _____ 2N491.
SCR 76, 77 _____ 2N2326.

The capacitors should be of a type to match the particular selected cadmium-sulphide photoresistive element herein assumed.

While the invention here has been described in connection with a photometric device, it will be appreciated that it readily may be extended to use for making other measurements of light intensity and for various applications on automatic systems. Illustrative of their use are for densitometer, sensitometers, photographic printers and exposure determining systems. As a further extension of the inventive concept herein set forth, the lamp 56 may at times be replaced by a transformer or a generally similar element through which the resulting activating pulse or signal may be applied to a suitable servo amplified which may drive the emitter 62 of the unijunction transistor 61 thereby to provide an automatic balancing of the system. However, further modificaitons will be apparent to those skilled in the art from reading the claims to follow.

Having now described the invention what is claimed is:

1. A photometric device comprising a first variable interval timer circuit (37, 38, 40) including radiation responsive means (37) for determining the timing interval of said first timer circuit as a function of the intensity of radiation falling upon the radiation responsive means (37), a second variable interval timer circuit (58, 59, 62) including adjustable control means (58, 60) for controlling the timing interval of said second timer circuit, means (34) for simultaneously exciting both said timer circuits, indicator (56) means, and means (53, 54) responsive to both said timer circuits for conjointly controlling the operation of said indicator means (56) whereby when said adjustable control means (58, 60) is so set that said indicator means (56) operates, such setting is representative of the intensity of the radiation falling upon said radiation responsive means (37).

2. A photometric device comprising first and second storage elements (38, 59) to store electrical charges under controlled conditions, radiation responsive means (37) adapted to influence the charge to be accumulated by the first of the storage elements (38) as a function of the intensity of radiation received by said radiation responsive means (37), adjustable control means (56, 60) adapted to influence the charge to be accumulated by the second of the storage elements (59), means (34, 35) for simultaneously cyclically charging both of said storage elements, first and second unijunction transistor means (40, 61) to discharge respectively the first and second of said storage elements (38, 59) upon the attainment by said first and second of said storage elements of certain respective pre-established charge levels, indicating means (56), and circuit means (54, 53) responsive to the simultaneous operation of said unijunction transistors to excite said indicating means, whereby when said adjustable control means is so set that said unijunction transistors fire together, the setting thereof is a measure of the radiation intensity effective on the first storage element.

3. A photometric device comprising first and second capacitor elements (38, 59) to store electrical charges under controlled conditions, radiation responsive photoresistive means (37) to control the rate at which charge is accumulated by the first of the capacitor elements (38) so that the charge level achieved within a known time period is proportional to the intensity of radiation reaching said means, resistive means (58) to control the rate at which charge is accumulated by the second of the capacitor elements (59) to establish a known charge level therein within a known time period, means (34, 35) for cyclically charging the capacitor eleemnts, first and second means, (40, 61) to discharge respectively both of the capacitor elements upon their attainment of pre-established charge levels, means (56) for indicating the simultaneous discharge of said capacitor elements, and means (60) for adjusting the charging rate of the second capacitor element under control of the resistive means to bring the accumulated charge within the charging period prior to discharge into identity with that of the first capacitor element co-operative with said radiation responsive photoresistive means thereby to provide by the adjustment of the charging rate of the second capacitor element a measure of the radiation impinging on the photoresistive element.

4. The device claimed in claim 3 wherein said first and second means to discharge are unijunction transistors, and wherein said device includes a silicon controlled rectifier (48) having its gating electrodes (46) connected to receive a gating pulse from one of the unijunction transistors (40) concurrently with discharge thereby of its respective capacitor element (38), and means (50) provided by said silicon controlled rectifier (48) for disabling the charging of at least one of the capacitor elements (38).

5. The device claimed in claim 4 including a second silicon controlled rectifier (68) and circuit means (68') to gate said second silicon controlled rectifier to a conductive state concurrently with discharge of the second capacitor element (59), and means (53, 54) responsive to the simultaneous discharge of both said capacitor elements (38, 59) to actuate said means for indicating such simultaneous discharge.

6. A photometric device comprising means (34) to supply a source of alternating current power, and a half-wave rectifier device (35, 52) to produce operating voltage for the device during alternate half-cycles of the source, first and second storage elements (38, 59) to store electrical charges under controlled conditions, radiation responsive means (37) to control the rate of charge to be accumulated by the first of the storage elements (38) within a time in proportion to an in-falling intensity of radiation active on said radiation responsive means (37), a resistance control means (58) to control the rate of charge to be accumulated by the second of the storage elements (59) to establish a charge level therein, said half-wave rectifier device (35, 52) supplying operating voltages in a cyclic fashion during alternate half-cycles of the supplied power simultaneously to each storage element for charging the storage elements according to such cyclic rate, means (40, 61) to discharge both of the storage elements upon their attainment of a pre-established charge levels, means (56) for indicating the simultaneous discharge of the said storage elements, a pair of silicon controlled rectifier devices (53, 54) connected to be gated concurrently with the discharge of the storage elements (38, 59), said photometric device being so adapted that when one of said silicon controlled rectifier devices (53) is first activated the means (56) for indicating is disabled for the unexpired portion of the half-cycle period in question, the other of said silicon controlled rectifier devices being adapted to activate the indicating means, and means (60) for setting the charging rate of the second storage element (59) under control of the resistance control means (58) to bring its acquired charge in the selected time period into substantial identity with that of the charge storage element responsive to radiation thereby to provide by the setting a measure of the radiation intensity effective to control charging of the first of the storage elements.

References Cited

UNITED STATES PATENTS

| | | |
|---|---|---|
| 2,100,755 | 11/1937 | Shepard. |
| 2,780,752 | 2/1957 | Aldrich et al. _____ 315—240 |
| 2,862,416 | 12/1958 | Doyle _____ 307—311 X |
| 2,924,754 | 2/1960 | Mead. |
| 3,056,332 | 10/1962 | Beregowitz. |
| 3,371,252 | 2/1968 | James _____ 317—142 X |

OTHER REFERENCES

Rickard, R. K.: "Analysis of Printer Integrating Circuits," Photographic Science and Engineering, vol. 4, No. 5, September–October 1960, pp. 288–290.

Pinney et al.: "Simple Automatic Reflection Color Densitometer," Photo. Sci. & Eng., vol. 6, 1962, pp. 253–254.

JEWELL H. PEDERSEN, Primary Examiner

WARREN A. SKLAR, Assistant Examiner

U.S. Cl. X.R.

356—218, 226; 95—10; 324—68; 307—311; 355—68